United States Patent [19]

Quint et al.

[11] Patent Number: 5,225,638
[45] Date of Patent: Jul. 6, 1993

[54] HYDROGEN-OXYGEN ACOUSTIC LOGGING DEVICE

[75] Inventors: Edwinus N. M. Quint; Jacobus J. W. Staal; Robert N. Worrall, all of Rijswijk, Netherlands

[73] Assignee: Shell Oil Company, Houston, Tex.

[21] Appl. No.: 840,249

[22] Filed: Feb. 24, 1992

[30] Foreign Application Priority Data

Jun. 10, 1991 [GB] United Kingdom ............... 9112421

[51] Int. Cl.$^5$ .................................................. G01V 1/40
[52] U.S. Cl. ...................................... 181/106; 367/911
[58] Field of Search .................. 181/106, 116, 117; 367/145, 911

[56] References Cited

U.S. PATENT DOCUMENTS

| | | | |
|---|---|---|---|
| 2,679,205 | 5/1954 | Piety | 102/20 |
| 3,587,775 | 6/1971 | Baier, Jr. | 181/116 |
| 4,207,619 | 6/1980 | Klavences | 367/36 |
| 4,706,228 | 10/1987 | Owen et al. | |
| 5,058,077 | 10/1991 | Twist | 367/25 |

FOREIGN PATENT DOCUMENTS 2231152 7/1990 United Kingdom .

Primary Examiner—Ian J. Lobo

[57] ABSTRACT

A hydrogen-oxygen acoustic logging device is provided for generating acoustic waves for logging a subsurface formation when arranged in a borehole through the formation. The device is electrically driven for electrolyzing water to a gaseous hydrogen-oxygen mixture and for firing the gaseous mixture for generating the waves. The device comprises an inflatable compartment to be inflated by the gaseous hydrogen-oxygen mixture. The device further comprises a housing having an outer wall facing and closely fitting to a borehole wall portion, and provided with a recess. The recess contains the inflatable compartment and, when arranged in logging position against said borehole wall portion, defines a substantially closed wave generating chamber.

15 Claims, 1 Drawing Sheet

HYDROGEN-OXYGEN ACOUSTIC LOGGING DEVICE

FIELD OF THE INVENTION

The present invention relates to a hydrogen-oxygen acoustic logging device for generating acoustic waves in a borehole.

In particular the invention relates to a hydrogen-oxygen acoustic logging device for generating acoustic waves for logging a subsurface formation when arranged in a borehole through the formation, the device being electrically driven for electrolyzing water to a gaseous hydrogen-oxygen mixture and for firing the gaseous mixture for generating the waves, and the device comprising at least an inflatable compartment to be inflated by the gaseous hydrogen-oxygen mixture.

BACKGROUND OF THE INVENTION

U.S. Pat. No. 3,587,775 discloses a seismic acoustic source that generates sound by electrolytically dissociating water into gaseous hydrogen and oxygen. The hydrogen and oxygen are then allowed to explosively recombine. The explosive recombination results in the sound waves. The source has been built in a tubular housing hung on a wireline cable within a well borehole.

A portion of the outer wall of the housing is made from a flexible material, thus defining an annular compartment. Surface equipment provides both dissociating power and the firing power. The ends of the portion are clamped firmly to the outer wall of the housing whereas longitudinal slots in the tubular housing wall permit waves generated to travel outwardly through the borehole fluid and into the formation.

In such a way a relatively compact device is designed. The apparatus is operable and firable repetitively at various levels in a borehole without requiring the addition of any material from the surface, although many problems remain.

For example, although firing, the dissociated hydrogen and oxygen will result in inflating the flexible wall portion throughout the slots. Thus the source cannot be considered pointlike. Moreover waves will propagate in all directions thus dividing power both in the direction of the borehole wall, and upwardly and downwardly into the borehole fluid.

It is also a disadvantage that the device can be employed only in a separate logging procedure instead of in combination with drilling operations.

U.S. Pat. No. 2,679,205 discloses seismic sound source generating waves similar to that disclosed in U.S. Pat. No. 2,679,775. In particular U.S. Pat. No. 2,679,205 discloses a sound source comprising a compartment for a gaseous hydrogen-oxygen mixture which is flexible as a whole. Although a more pointlike source device results, unpredictable sound direction components and disadvantageous power dissipation remain.

U.S. Pat. No. 4,207,619 discloses another seismic well logging system and method. In particular, it discloses a source device arranged at the lower end of the drill bit string and capable of producing a sonic pulse. The pulses may be produced, for example, by induced vibrations, implosions, explosions, or sudden injections of fluid against the bottom of the borehole. The source device is driven and controlled, for example, by a sequence timer whereas pulses are generated whenever the drilling operation is temporarily halted to add a new segment of drill pipe to the drill string. Thus measuring is carried out while drilling in a semi-continuous way. As a further feature pulses at a single level may be summed to enhance the distinction between the pulses and the noise generated by the engines associated with the drilling operations. The above logging method uses surface detector systems to detect the waves generated which have passed the subsurface formation, thereby having been refracted and/or reflected, resulting in formation mappings and drill steering information.

Conditions for arranging and driving a source device near the bit are very severe. High rotation speeds, severe drilling and grinding conditions, and noise will occur as a result of the drill bit hammering onto the borehole bottom.

Although an overall method and related device for transmitting, receiving, and interpreting acoustical signal data from start to finish are presented in the above document, difficulties met in arranging such a device near the drill bit are not addressed.

Thus, it is an object of the invention to present a method and a logging device enabling a substantially undisturbed and immediate transfer of acoustic power from the device into the subsurface formation.

It is a further object of the invention to provide such a method and device of creating acoustic pulses at any moment and at any borehole level desired as long as the drill operations continue.

It is another object of the invention to provide a method and a logging device to create pulses from near or on the drill bit which are clearly distinguishable from further noise, such as bit noise.

It is yet a further object of the invention to drive and control the logging device continuously and reliably.

SUMMARY OF THE INVENTION

These and other objects are accomplished by a hydrogen-oxygen acoustic logging device for generating acoustic waves for logging a subsurface formation when arranged in a borehole through the formation, the device being capable of electrolyzing water to a gaseous hydrogen-oxygen mixture and firing the gaseous mixture for generating the acoustic waves, and the device comprising an inflatable compartment to be inflated by the gaseous hydrogen-oxygen mixture, wherein the device comprises a housing, having an outer wall facing and closely fitting to a borehole wall portion, and provided with a recess which contains the inflatable compartment and, when arranged in logging position against the borehole wall portion, defines a substantially closed wave generating chamber.

In a first embodiment of the invention the housing is a blade of a drill string stabilizer unit.

In a second embodiment of the invention the housing is a drill bit, preferably a junk slot of the drill bit.

The recess advantageously comprises a bottom to which the inflatable compartment of the device is fastened.

By employing the device as indicated above, in particular the wave generating chamber restricted to a well defined position within the borehole, a clear pointlike acoustic sound source for logging purposes is obtained.

Furthermore, the sound source separated from the borehole fluid column present in the borehole advantageously results in a well defined power transfer to the subsurface formation.

DETAILED DESCRIPTION OF THE INVENTION

Figure 1:
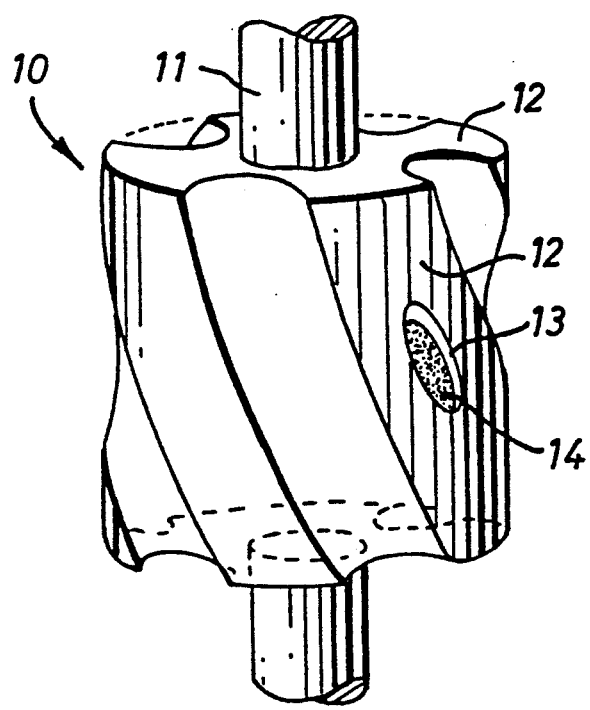
FIG. 1 is a perspective view on a first embodiment of the logging device in accordance with the invention.

Referring to FIG. 1 a perspective view of a first embodiment of the logging device in accordance with the invention is shown. FIG. 1 presents a stabilizer unit 10 as part of a drill string assembly. As can be seen in the figure the stabilizer 10 is connected to a drill string 11 (only partly shown). The stabilizer unit 10 comprises a plurality of stabilizer blades 12, for example four blades as shown in this figure. Moreover the blades have outer walls which face the cylindrical borehole wall and which are closely fitting thereto. Consequently, indicated by its name, the blades are centralizing and stabilizing the drill string, in that the blades are closely contacting and sliding along a portion of the borehole wall, being substantially cylindrical.

Advantageously a recess is arranged within such a blade 12. The blade functions as a housing for the recess, which is positioned per se adjacent to the cylindrical borehole wall, and which thus defines a substantially closed chamber. Within the chamber forming recess 13 an inflatable compartment 14 made of a flexible material is arranged. The compartment functions as a source for generating acoustic waves.

As will be clear to those skilled in the art, although the recess mentioned above is arranged in a unit of a drill string assembly, a further embodiment of the present invention concerns a separate tool for logging a subsurface formation. The tool will also have the above explained outer wall/cylindrical borehole wall-geometry and can be positioned against the borehole wall in a suitable way. For example the tool can be clamped by means of a spring or a clamping device which comprises hinging arms, foldable outwardly and inwardly.

Figure 2B:
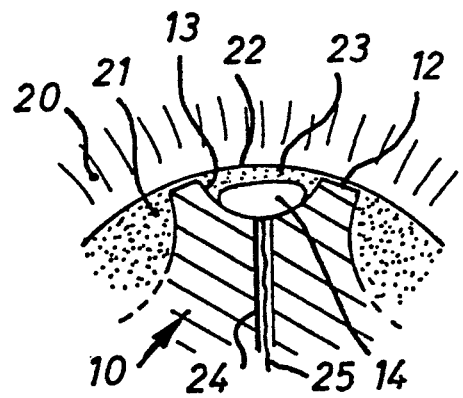
FIGS. 2A, 2B and 2C present particulars of the embodiment shown in FIG. 1. Each of FIGS. 2A to 2C shows a part of a cross-section taken perpendicular to a vertical axis, through the stabilizer unit.
Figure 2A:
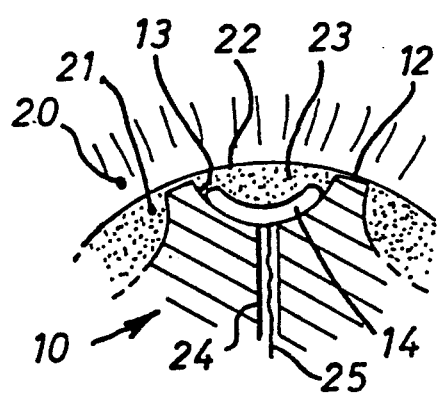
Figure 2C:
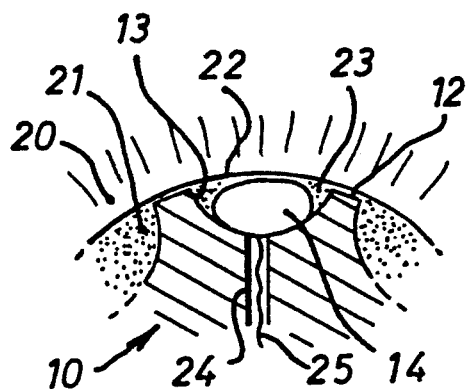

Referring now to the FIGS. 2A to 2C details of the above embodiments are shown in more detail.

In the cross-sections shown the stabilizer unit 10 is arranged in a borehole 21 which has been bored in subsurface formation 20. As can be seen in the FIGS. 2A to 2C the stabilizer blade 12 as shown is arranged against borehole wall 22 thus centralizing and stabilizing as mentioned before (for reason of clarity only one blade 12 has been shown; for the separate tool embodiment similar figures can be presented).

When a drilling action is performed mud 23 will fill up the spacing left between the unit and the wall.

In the cross-sections, the height of the logging device compartments 14 are shown empty in FIG. 2A, inflated in FIG. 2B and being fired in FIG. 2C.

In FIGS. 2A to 2C the device defines a substantially closed wave generating chamber between the blade and the borehole wall.

Compartments 14 contain an amount of water which is made electrically conductible by a small addition of an electrolyte. For example a certain amount of potassium hydroxide is added to make the water electrically conductible to a sufficient extent. A pair of electrodes (not shown) is positioned within the water in order to at least partly electrolyze the water to a gaseous hydrogen-oxygen mixture. In a further step the mixture is fired by means of a firing device also arranged within the compartment, resulting in an explosion. The explosion generates acoustic waves. After firing the hydrogen and oxygen will recombine to water and the wave generating cycle can be repeated.

In FIGS. 2A to 2C conduits 24 guide electrical wires 25 to the compartment 14. The wires 25 are connected to the above-mentioned electrodes and to the firing device. For example the electrical wires are coupled to the lower part of the compartment.

The dimensions of the inflatable compartment are preferably chosen in such a way that the compartment is unstretched in the fired situation. Thus no work or energy is used for inflating the compartment against its own elasticity. Furthermore, because the wave generating chamber is substantially closed and the mud is incompressible, the impulse created by firing the gaseous hydrogen-oxygen mixture is transferred immediately into the formation.

Figure 3:
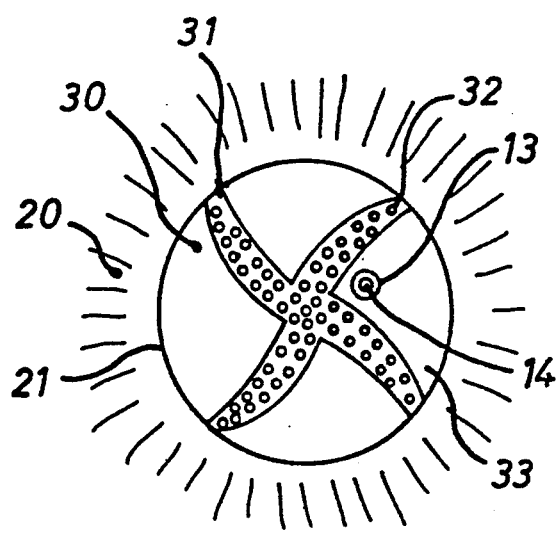
FIG. 3 is a view on a second embodiment of the logging device in accordance with the invention, seen from the bottom side of the borehole looking onto the drill bit outer end surface.

In FIG. 3 a second embodiment of the logging device in accordance with the invention is shown. In axial direction from the bottom side of the borehole 21 in the subsurface formation 20 a drill bit 30 at its outer end surface is presented. This is a bottom view of a drill bit containing a inflatable compartment. The drill bit 30 comprises bit blades 31. The bit blades, protrude from a hemispherical-like bit end surface. Cutter elements 32, mostly being elements of diamond, are arranged on the bit blades in order to bore the borehole by being rotated around its axis on the bit blades. Junk slots 33 between the bit blades 31 complete the outer end surface of the bit.

The drill bit 30 continuously makes contact with the bottom of the borehole at one side for further cutting into the subsurface formation. The other side the circumference of the hemispherical-like end surface of the drill bit is closely fitted into the borehole against the borehole wall. In this embodiment a substantially closed wave generating chamber is defined between the surface of a junk slot 33, the respective bit blades 31 and the bottom part of the borehole. A recess 13 comprising an inflatable compartment is preferably arranged in a junk slot. Operation of such a logging device will correspond with that of the first embodiment.

The inflatable compartment 14 is preferably fastened to the bottom of the recess 13. Thus, because the compartment is compressed by the hydrostatic pressure of the mud column within the borehole, damage of the compartment by scraping along the borehole wall is avoided.

Because of the fact that the compartment has to be inflated against the hydrostatic compression forces it is made of a suitable flexible and elastic material such as rubber, a plastic material, or even a metal such as a sheet of a suitable metal, for example, steel.

Dependent on the geometry of the recess an inflatable compartment formed as a bellows can be arranged. For example in the drill bit embodiment such a bellows can be fastened advantageously at the bottom of a hollow cylindrical recess. Furthermore, in an axially extending cylindrical recess or slot, having an upper and lower end and facing the cylindrical borehole wall, an elongated compartment such as an elastic tire section can be arranged and fastened with its end portions to said ends.

In this field of application many ways of employing such waves are known. Two main applications are elaborated on as examples.

Firstly, waves generated downhole can be detected by means of an array of detectors at the surface after the waves have passed through the subsurface formations. Wave characteristics so detected will result in mappings of the subsurface formation surrounding, and also beneath, the borehole concerned. These maps are obtained from direct travelling, reflecting and refracting waves. This technique is referred to as inverse vertical seismic profiling (IVSP). If this particular technique is used during a drilling operation it is called seismic while drilling (SWD).

Secondly, waves generated downhole can also be detected downhole by means of one or more detectors relatively close to or even alongside the logging device of the invention. In that case information is obtained about the near source environment. For the situation that this technique is used during a drilling operation the data obtained could be useful for bit steering control. This technique is referred to as measuring while drilling (MWD), or logging while drilling (LWD).

At least one receiver for detecting the above-mentioned acoustical waves is preferably included in the logging device of the invention. Additionally, in order to process the data obtained by the receiver a seismic data processing unit can be included. Such a data processing unit can further comprise or even can be made up of a memory unit.

Particularly when the logging device is arranged in a unit of the drilling assembly, the device is preferably electrically driven by means of an in-situ arranged power generator. The power generator in turn can be driven by a mud motor. A mud motor driving a generator is preferred because this overcomes great problems presented when using wire lines during drilling due to the rotation of the drilling assembly. Because mud motors are widely available in many varieties effective matching and connecting to the device presented no major obstacles.

The stabilizer device in accordance with the present invention is preferably used to permit more closely controlled steering of a drill bit and to prevent the possibility of generating tube waves (waves through the borehole column caused by reflections at the bottom of the borehole).

Another preferred embodiment of the present invention includes a plurality of inflatable compartments arranged symmetrically around the housing. For example, two inflatable compartments may be arranged on opposite sides of the drill bit or stabilizer to permit symmetrical firing. Such a second device is electrically powered more economically.

Widely known techniques such as mud pulse telemetry or electromagnetic pulsing can be used to transmit data to the device or from the device to the surface. Moreover, as soon as the drilling operations have been stopped, a wireline can be connected for further transmission of data, for example from the memory unit. A combination of mud motor driving and wireline transmission at the same time can also be applied.

We claim:

1. A hydrogen-oxygen acoustic logging device for generating acoustic waves for logging a subsurface formation when arranged in a borehole through the formation, the device being capable of electrolyzing water to a gaseous hydrogen-oxygen mixture and firing the gaseous mixture for generating the acoustic waves, and the device comprising an inflatable compartment to be inflated by the gaseous hydrogen-oxygen mixture, wherein the device comprises a drill string stabilizer unit having an outer wall facing and closely fitting to a blade of a borehole wall portion, and provided with a recess which contains the inflatable compartment and, when arranged in logging position against the borehole wall portion, defines a substantially closed wave generating chamber.

2. The device of claim 1, wherein the recess is an axially extending slot having an upper and lower end and wherein the inflatable compartment has an elongated form fastened to the ends.

3. The device of claim 1, wherein the drill string stabilizer unit is the near drill bit stabilizer unit.

4. The device of claim 1, wherein the inflatable compartment is formed from rubber.

5. The device of claim 1, wherein the inflatable compartment is formed from a plastic material.

6. The device of claim 1, further comprising at least one receiver for detecting the waves after having passed the formation and representing seismic data.

7. The device of claim 1, wherein the device further comprises a seismic data processing unit operatively associated with the wave generating chamber.

8. The device of claim 7, wherein the processing unit comprises a memory unit.

9. The device of claim 7, wherein the processing unit is transmitting data to a surface station by a method selected from the group consisting of mud pulse telemetry, wireline, and electromagnetic pulsing.

10. The device of claim 1, wherein the device is electrically driven by means of an in situ power generator.

11. The device of claim 10, wherein the in situ power generator is driven by means of a mud motor.

12. The device of claim 1, wherein the device is electrically driven through a wireline connected surface generator.

13. The device of claim 1, wherein the device is electrically driven by a combination of an in situ power generator and a wireline connected surface generator.

14. A hydrogen-oxygen acoustic logging device for generating acoustic waves for logging a subsurface formation when arranged in a borehole through the formation, the device being capable of electrolyzing water to a gaseous hydrogen-oxygen mixture and firing the gaseous mixture for generating the acoustic waves, and the device comprising an inflatable compartment to be inflated by the gaseous hydrogen-oxygen mixture, wherein the device comprises a drill bit, having an outer wall facing and closely fitting to a borehole wall portion, and provided with a recess which contains the inflatable compartment and, when arranged in logging position against the borehole wall portion, defines a substantially closed wave generating chamber.

15. The device of claim 14, wherein the housing is a junk slot of the drill bit.

* * * * *